(12) United States Patent
Abramov et al.

(10) Patent No.: US 8,011,207 B2
(45) Date of Patent: Sep. 6, 2011

(54) LASER SCORING OF GLASS SHEETS AT HIGH SPEEDS AND WITH LOW RESIDUAL STRESS

(75) Inventors: Anatoli A. Abramov, Painted Post, NY (US); Yawei Sun, Horseheads, NY (US); Wei Xu, Painted Post, NY (US); Naiyue Zhou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 669 days.

(21) Appl. No.: 12/008,949

(22) Filed: Jan. 15, 2008

(65) Prior Publication Data

US 2009/0126403 A1     May 21, 2009

Related U.S. Application Data

(60) Provisional application No. 61/003,738, filed on Nov. 20, 2007.

(51) Int. Cl.
*C03B 33/00* (2006.01)
*C03B 33/02* (2006.01)
*C03B 33/037* (2006.01)

(52) U.S. Cl. .......................... 65/112; 65/29.18
(58) Field of Classification Search ............... 65/112
See application file for complete search history.

(56) References Cited

U.S. PATENT DOCUMENTS

| | | | |
|---|---|---|---|
| 3,543,979 A | 12/1970 | Grove et al. | 225/2 |
| 4,749,400 A * | 6/1988 | Mouly et al. | 65/97 |
| 5,609,284 A | 3/1997 | Kondratenko | 225/1 |
| 5,776,220 A | 7/1998 | Allaire et al. | 65/112 |
| 5,984,159 A | 11/1999 | Ostendarp et al. | 225/93.5 |
| 6,211,488 B1 | 4/2001 | Hoekstra et al. | 219/121.72 |
| 6,237,875 B1 | 5/2001 | Menne et al. | 244/138 |
| 6,327,875 B1 | 12/2001 | Allaire et al. | 65/103 |
| 6,489,588 B1 | 12/2002 | Hoekstra et al. | 219/121.67 |
| 2008/0283509 A1 * | 11/2008 | Abramov et al. | 219/121.72 |

* cited by examiner

*Primary Examiner* — Matthew Daniels
*Assistant Examiner* — Cynthia Szewczyk
(74) *Attorney, Agent, or Firm* — Thomas R. Beall

(57) ABSTRACT

Experimental data is presented which shows that laser scoring of glass sheets (112) with existing techniques produces unacceptable levels of residual stress in the separated sheets as the scoring speed is increased. Methods for solving this problem are disclosed which employ elongated and, preferably, asymmetrically-truncated laser beams (13). The methods allow glass sheets (112) to be scored at speeds of 1000 mm/s and above with low levels of residual stress, e.g., levels of residual stress which are less than or equal to 500 psi. Such low levels of residual stress translate into low levels of distortion during the manufacture of display panels (e.g., LCD panels) as well as in improved properties of the separated edges. The methods can be used with glasses of various types including glasses having low coefficients of thermal expansion.

11 Claims, 10 Drawing Sheets

PRIOR ART

LASER SCORING OF GLASS SHEETS AT HIGH SPEEDS AND WITH LOW RESIDUAL STRESS

I. CLAIMING BENEFIT OF PRIOR FILED U.S. APPLICATION

This application claims the benefit of U.S. Provisional Application Ser. No. 61/003,738, filed on Nov. 20, 2007. The content of this document and the entire disclosure of publications, patents, and patent documents mentioned herein are incorporated by reference.

II. FIELD OF THE INVENTION

This invention relates to the laser scoring of glass sheets, such as the sheets used as substrates in the production of display devices, e.g., thin film transistor liquid crystal displays (TFT-LCDs).

III. BACKGROUND OF THE INVENTION

Cutting of glass is conventionally accomplished by using mechanical tools; however, an alternative process exists that uses $CO_2$ laser radiation at a wavelength of 10.6 μm to heat the glass and create tensile stress via a temperature gradient. The use of a $CO_2$ laser for glass cutting is discussed in: Kondratenko, U.S. Pat. No. 5,609,284 entitled "Method of splitting non-metallic materials" (the '284 patent); commonly-assigned Allaire et al., U.S. Pat. No. 5,776,220 entitled "Method and apparatus for breaking brittle materials" (the '220 patent); Ostendarp et. al. U.S. Pat. No. 5,984,159 entitled "Method and apparatus for cutting through a flat workpiece made of brittle material, especially glass" (the '159 patent); and commonly-assigned Allaire et al., U.S. Pat. No. 6,327,875 entitled "Control of median crack depth in laser scoring" (the '875 patent). The contents of the commonly-assigned '220 and '875 patents are incorporated herein by reference in their entireties.

As shown in FIG. 9, during laser scoring a median crack 115 (also known as a partial vent or, simply, a vent) is created in a major surface 114 of a glass sheet 112. In order to create the vent, a small initial flaw 111 is formed on the glass surface near one of its edges, which is then transformed into the vent by propagating laser light 121 formed into a beam 113 across the surface of the glass followed by a cooling area produced by a cooling nozzle 119. Heating of the glass with a laser beam and quenching it immediately thereafter with a coolant creates a thermal gradient and a corresponding stress field, which is responsible for the propagation of the vent.

Laser beams having various shapes and sizes have been employed in the patents referred to above. The scoring beam described in the '284 patent had a short elliptical shape with the longest axis of the beam being less than 10 times the material thickness. In accordance with this approach, in the case of a glass sheet having a thickness of 0.7 mm, the typical thickness of a display substrate, the length of the beam's long axis should not exceed 7 mm. In the '220 patent, the scoring beam had an elongated elliptical shape with the longest axis preferably greater than 40 mm. In the '875 patent, the beam was truncated from one or both ends, and as a result, the total length of the beam was reduced by 20-40%. In the '159 patent, a U-shape beam created by a scanning technique was used for scoring.

A variety of scoring speeds are described in the above patents ranging from a low of 6 mm/s in the examples of the '284 patent to 1000 mm/s for the complex beam structure of the '159 patent. Significantly, none of these references contain any mention of the problem of residual stress produced in glass sheets as a result of laser scoring. As such, the references are completely silent as to the problem of increased residual stress which, in accordance with the invention, has been found to accompany increases in scoring speed.

Residual stress is a particularly significant problem in the case of glass sheets that are to be used as substrates in display devices. Many display devices, such as TFT-LCD panels and organic light-emitting diode (OLED) panels, are made directly on glass substrates. To increase production rates and reduce costs, a typical panel manufacturing process simultaneously produces multiple panels on a single substrate or a sub-piece of a substrate. At various points in such processes, the substrate is mechanically divided into parts along cut lines.

Such mechanical cutting changes the stress distribution within the glass, specifically, the in-plane stress distribution seen when the glass is vacuumed flat. Even more particularly, the cutting relieves residual stresses in the sheet at the cut line since the cut edge is rendered traction free. Such stress relief in general results in changes in the vacuumed-flat shape of the glass sub-pieces, a phenomenon referred to by display manufacturers as "distortion."

Although the amount of shape change as a result of stress relief is typically quite small, in view of the pixel structures used in modern displays, the distortion resulting from mechanically cutting individual panels out of a larger sheet can be large enough to lead to substantial numbers of defective (rejected) displays. Accordingly, the distortion problem is of substantial concern to display manufacturers and specifications regarding allowable distortion can be as low as 2 microns or less.

The amount of distortion produced when such mechanical cutting is performed depends on the residual stress in the sheet, with lower levels of residual stress producing smaller distortions. As discussed above, the prior art relating to laser scoring is silent with regard to residual stress introduced into glass sheets during the scoring process. As such, the prior art is also silent with regard to the distortion resulting from such residual stress when the glass sheets are subsequently mechanically cut during panel manufacturing processes.

In addition to the distortion problem, as discussed below, residual stress is also important in terms of the quality of the edges produced when a laser scored sheet of glass is divided into two sub-pieces. In accordance with the invention, high levels of residual stress have been associated with edges having relatively low strength and poor quality, e.g., splinters and micro cracks. It has also been found that high residual stress nearby the glass edge may cause a gradual deterioration of the edge quality, namely chipping or delamination, which manifests itself some time after scoring or can be induced by an external impact. Again, the prior art is silent with regard to these problems with laser scoring.

A third problem with the prior art techniques for performing laser scoring relates to the CTE of the glass being scored. Prior art laser scoring techniques have used glasses with relatively high CTE's, e.g., Corning Incorporated's Code 1737 LCD glass which has a CTE (0-300° C.) above $37 \times 10^{-7}$/° C. More recent glasses, e.g., Corning's EAGLE$^{2000}$® and EAGLE XG™ glasses, have lower CTE's. Higher CTE's, such as that of Code 1737 glass, translate into higher tensile stresses during heating which, all other things being equal, means that it easier to laser score such glasses at higher speeds. The lower CTE's of the more modern glass substrates used by the LCD industry result in much lower scoring speeds when conventional laser scoring technology is used.

In view of these various problems, there exists a need in the art for processes that can provide high speed laser scoring of glasses having lower CTE's (i.e., CTE's less than $37 \times 10^{-7}/°$ C. (0-300° C.)) and at the same time do not generate excessive residual stresses.

IV. SUMMARY OF THE INVENTION

In accordance with a first aspect, the invention provides a method of scoring a glass sheet (112) comprising:

(a) translating (see arrow 17 in FIG. 1C) an elongated laser beam having a peak intensity $I_{peak}$ over a surface (114) of the glass sheet (112) at a speed S, said beam being characterized by an untruncated length $L_0$, where $L_0$ equals the maximum distance along the length of the beam between locations at which the beam intensity at the surface (114) of the glass sheet (112), in the absence of any truncation, has fallen to $1/e^2$ of $I_{peak}$; and (b) translating a coolant area (15) over the surface (114) of the glass sheet (112) in tandem with the laser beam;

wherein:

(i) S is greater than 500 millimeters/second;

(ii) $L_0$ is greater than or equal to 200 millimeters; and (iii) $I_{peak}$ and $L_0$ are selected such that the translation of the laser beam over the surface (114) of the glass sheet (112) at the speed S produces a maximum temperature at the surface (114) of the glass sheet (112) that is less than or equal to the glass' strain point, the lowest possible temperature being preferred.

In certain preferred embodiments, prior to contacting the surface (114) of the glass sheet (112), a portion (23) of the beam proximal to the coolant area (15) is truncated (e.g., up to 20% of $L_0$ is truncated). Preferably, only the portion of the beam proximal to the coolant area is truncated. In connection with these embodiments, the coolant area (15) is preferably located within the portion of the beam that would have contacted the surface (114) of the glass sheet (112) if the beam had not been truncated.

In accordance with a second aspect, the invention provides a method of operating a laser scoring system in which a vent (115) is produced in a glass sheet (112) by translating a truncated laser beam (13) over a surface (114) of the sheet in tandem with a coolant area (15) which has a center point, said method comprising selecting the amount of truncation of the laser beam (τ), or the distance (D) between the center point of the coolant area (15) and the nearest end of the laser beam prior to truncation, or both the amount of truncation (τ) and the distance (D) between the center point of the coolant area and the nearest end of the laser beam prior to truncation to control at least one of (i) the depth of the vent (115) and (ii) the residual stress in sub-pieces produced from the sheet (112).

In accordance with a third aspect, the invention provides a method of operating a laser scoring system in which a vent (115) is produced in a glass sheet (112) by translating a truncated laser beam (13) over a surface (114) of the sheet in tandem with a coolant area (15) which has an outer edge, said truncation of the laser beam producing a truncated edge proximal to the coolant area (15), said method comprising:

(a) changing the amount of truncation (τ) of the laser beam to accommodate or effectuate one or more of: a change in scoring speed, a change in vent depth, a change in glass composition, a change in sheet thickness, a change in residual stress in sub-pieces produced from the sheet, and a change in edge properties of sub-pieces produced from the sheet; and (b) as the amount of truncation (τ) of the laser beam is changed, holding constant the spacing (L) between (i) the truncated edge of the laser beam and (ii) the portion of the outer edge of the coolant area (15) closest to the truncated edge of the laser beam.

The reference numbers and symbols used in the above summaries of the various aspects of the invention are only for the convenience of the reader and are not intended to and should not be interpreted as limiting the scope of the invention. More generally, it is to be understood that both the foregoing general description and the following detailed description are merely exemplary of the invention and are intended to provide an overview or framework for understanding the nature and character of the invention.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification. It is to be understood that the various features of the invention disclosed in this specification and in the drawings can be used in any and all combinations.

V. BRIEF DESCRIPTION OF THE DRAWINGS

FIGS. 1A and 1B are schematic diagrams of prior art scoring systems. FIG. 1C is a schematic diagram of an embodiment of the present invention. The reference number 17 in these figures represents the direction of scoring.

FIG. 2 is a graph of calculated thermal histories of each point on a glass surface along a score line for different combinations of laser power and scoring speed for the case of a laser operating in dual mode. The laser beam had a length of 230 mm. Table 1 sets forth the laser powers and speeds for the various curves shown in this figure. The vertical axis in this figure shows temperature in ° C. and the horizontal axis shows time in seconds. The reference number 50 shows a maximum temperature limit and the reference number 60 shows a quenching area.

FIG. 3 is a graph of calculated transient thermal stress versus the parameters τ and D of FIG. 1C.

FIG. 4 is a graph of vent depth versus the parameter τ. The vertical axis shows vent depth in microns and the horizontal axis shows the degree of beam blockage (τ) in millimeters. The triangular data points are measured values and the curve is a fit to those values.

FIG. 5 is a graph of calculated exposure time (without quenching) versus scoring speed for a 60 mm beam (curve 20), as well as for beams in accordance with the invention which have a length greater than 200 mm, specifically, 250 mm (curve 22) and 300 mm (curve 24) in this figure. The vertical axis shows exposure time in seconds and the horizontal axis shows scoring speed in millimeters/second. The gap in the 60 mm curve (its dashed portion) indicates the location of the maximum achievable scoring speed with a 60 mm beam, shown by the reference number 26 in this figure.

FIG. 6 is a graph of measured peak glass surface temperatures produced by a representative beam of the invention (square data points) and a reference (comparative) beam (circular data points). The vertical axis shows peak glass surface temperature in ° C. and the horizontal axis shows laser power in %. In this graph, higher laser powers correspond to higher scoring speeds.

FIG. 7 is a graph of measured peak residual stress generated during laser scoring by a representative beam of the invention (square data points) and a reference (comparative) beam (circular data points). The vertical axis shows peak residual stress in psi and the horizontal axis shows laser power in %. In this graph, higher laser powers correspond to higher scoring speeds.

VI. DETAILED DESCRIPTION OF THE INVENTION AND ITS PREFERRED EMBODIMENTS

Figure 1A:
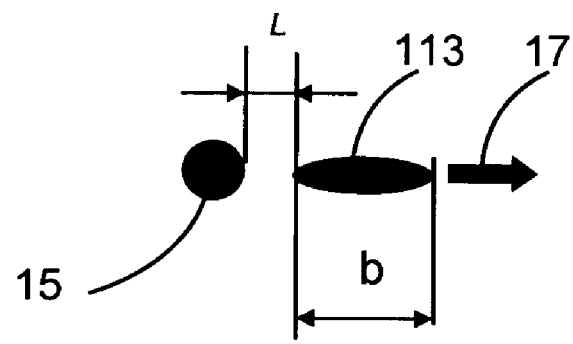

A. The Challenges of Scoring Glass Sheets at High Speeds

Laser scoring is typically performed using a carbon dioxide laser operating at a wavelength of 10.6 μm. At this wavelength the absorption of oxide glasses can exceed $10^5$-$10^6$ l/m, which makes the effective penetration depth of $CO_2$ radiation less than 1-10 μm. The typical vent depth required for successful scoring has to be in the range of 10-20% of the glass thickness, which corresponds to 70-140 μm for the typical substrates used in the manufacture of LCDs, i.e., substrates having a thickness of 0.7 millimeters. This means that formation of the vent during laser scoring mainly relies on thermal conductivity of the heat below the glass surface, which is a relatively slow process. Therefore, high surface absorption and thermal conductivity of the glass are the two fundamental factors that basically determine the process window and limit the scoring speed.

In order to reach the required tensile stress to form a vent the power density of the beam has to be high enough to provide a sufficient temperature differential at the surface of the glass (see below). However, if the power density is too high, the energy delivered to each point on the glass surface along the score line during the exposure can cause an ablation or evaporation of the glass. Such high power densities can also result in high levels of residual stress both at the edge of a separated sub-piece and within the area adjacent to it. On the other hand, if the exposure time is short (when the scoring speed is high), the energy delivered to the glass may be insufficient to heat the glass below the surface and to create a deep vent.

Theoretically, the problem might be solvable by using several beams to preheat the glass before cooling, or by multiple scans of a single beam along a score line. However, both methods require complicated optical and control schemes.

B. The Use of an Elongated Beam

In accordance with the present invention, the above challenges are addressed and solved using a simpler solution which surprisingly has been found to effectively score glass sheets at high speeds with low levels of residual stress, including glass sheets composed of glasses having low coefficients of thermal expansion. That solution involves the use of a single elongated beam with an untruncated length $L_0$ (see below) which is greater than or equal to 200 millimeters. Because of its long length, the beams used in the practice of the invention generally have large ratios of their major to minor axes, e.g., ratios greater than 130, preferably greater than 200, and most preferably greater than 300.

A beam of this type results in a prolonged residence time on the surface of the glass during scoring which enables the creation of a deep vent even at scoring speeds exceeding 1000 mm/s. Moreover, the beam configuration and power distribution of the laser mode can be chosen to keep power density at a relatively low level enabling a consistent scoring process without overheating of the glass surface above the strain point of the glass being scored. This represents a clear advantage of the method since it means that high scoring speeds can be used without the generation of high levels of residual stress. In addition, it has been found (see below) that the tensile stress generated during the scoring can be maximized by adjusting the relative position of the cooling zone and the trailing edge of the beam. This allows the temperature differential along the surface of the glass to be increased while holding the maximum temperature at the surface of the glass below the glass' strain point.

In accordance with certain preferred embodiments, laser scoring is performed using a non-symmetrical laser beam, e.g., a beam which has been truncated on just one end. Preferably, the beam has a size (length) and power density which can be varied so as to accommodate different glass types and/or processing conditions (e.g., scoring speeds), although beams having a fixed size and power density can be used in the practice of the invention if desired, e.g., in connection with a dedicated scoring station used for a single type and thickness of glass.

C. Laser Scoring with an Elongated Beam

In order to create and propagate a laser vent at a given speed each point on the glass surface should experience the same thermal history determined by the following parameters: laser power and distribution of the power density within the laser beam; heating speed; maximum glass surface temperature achieved during heating; and quenching efficiency and location of the quenching zone. In general terms, the scoring methods of the invention balance the system's process parameters such that a variation of one parameter is compensated by a variation of one or more other parameters so as to maintain essentially the same desirable thermal history for each point on the glass surface along the score line.

For any given type of glass and scoring speed, the invention achieves high speed scoring with low residual stress by meeting the following conditions:

(1) the transient thermal stress created by heating and subsequent cooling of each point of the score line exceeds the breaking stress of the glass allowing stable propagation of the vent once it originates from an existing flaw;

(2) the exposure of each point on the glass surface along the score line to laser radiation is sufficient to create a relatively deep vent, but, on the other hand, the duration of the exposure and the power density of the laser beam are selected so as not to cause overheating of the glass surface thus allowing the process to be run without inducing substantial amounts of residual stress; and (3) the location of the quenching zone within the trailing edge of the beam is chosen to maximize the thermal stress gradient for a given maximum glass surface temperature.

Figure 1B:
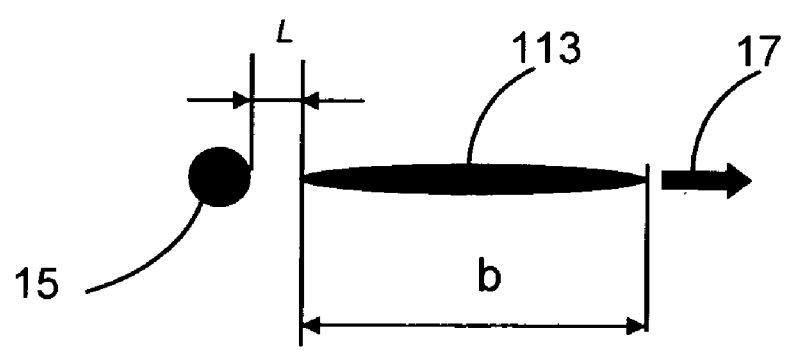
Figure 1C:
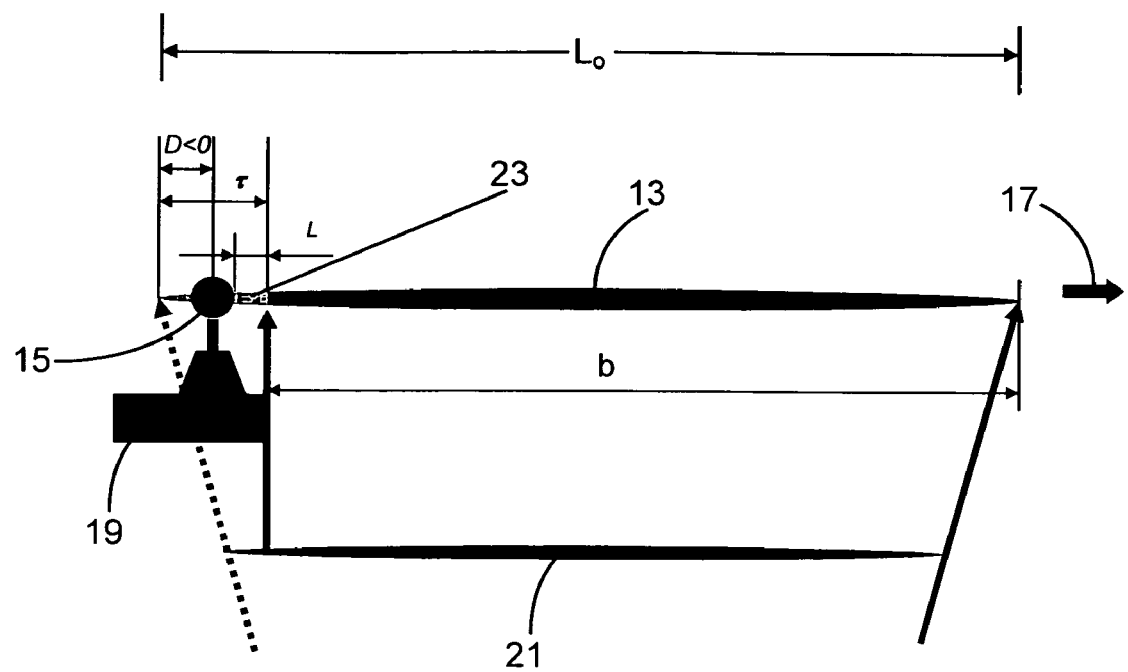

The application of these principles can be best understood by considering FIG. 1 which schematically illustrates the process of the '284 patent in FIG. 1A, the process of the '220 patent in FIG. 1B, and an embodiment of the present invention in FIG. 1C.

As illustrated in FIGS. 1A and 1B, the laser scoring processes described in the '284 and '220 patents include heating of the glass surface with a laser beam 113 of a limited size followed by a quenching zone or cooling area 15. During the laser scoring, a median crack (or a partial vent) is created. As discussed above, to create the vent, a small initial flaw is first formed on the glass surface, which is then transformed into the vent and propagated by the laser beam and the quenching zone. According to the '284 and '220 patents, the cooling area is positioned at some distance outside the beam boundaries (see FIGS. 1A and 1B).

Although the configurations of FIGS. 1A and 1B can achieve scoring, they are limited to speeds of 20 mm/s-500 mm/s depending on glass type. Any attempt to increase the scoring speed using the same configurations entails overheating of the glass which, in accordance with the invention, has been found to produce high residual stress levels as a result of the higher applied power densities. Moreover, the residual stress effect becomes more pronounced at higher scoring speeds, especially in the case of a low thermal expansion glass.

The approach of the embodiment of FIG. 1C overcomes these problems by employing a significantly longer laser beam and, in accordance with the most preferred embodiments of the invention, by truncating one end of the beam to produce an asymmetrical beam footprint on the surface of the glass sheet.

The basis for this approach can be understood from the following considerations. From a mechanical engineering point of view, the scoring process can be described in terms of the tensile stress $\sigma$ produced in the glass during the scoring process. This tensile stress is proportional to $\alpha * E * \Delta T$, where $\alpha$ is the glass' linear thermal expansion coefficient (CTE), E is the glass' modulus of elasticity, and $\Delta T$ is a measure of the temperature difference on the glass' surface between the portion of the surface located under the laser beam and the portion located under the cooling nozzle.

To produce a vent, the generated tensile stress has to be higher than the molecular bonds of the glass. The lower a glass' CTE and modulus of elasticity, the lower the generated tensile stress and, consequently, the lower the scoring speed for a given set of conditions. For a given $\alpha * E$ product, tensile stress $\sigma$ can be increased by heating the glass to a higher temperature. However, overheating of the glass close to or above its strain point causes glass ablation and entails the formation of irreversible high residual stress in the glass, which deteriorates the quality of the glass' edge, reduces its strength and makes for inconsistent operation of the scoring process.

Figure 2:
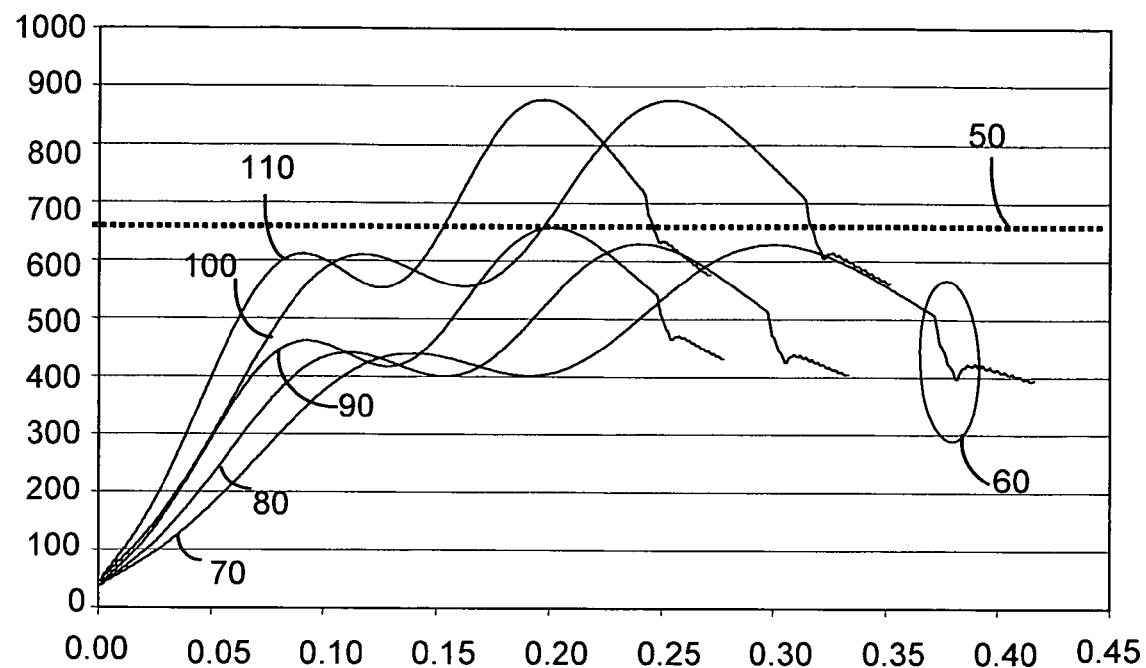

To address these problems, studies were undertaken in which the temperature variation as a function of time (thermal history) was calculated at each point of a glass surface along a score line. In an ideal case, during scoring, each point of a glass surface on a score line should experience the same temperature change over the same period of time. FIG. 2 shows the thermal history calculated for different combinations of laser power and speed using a beam length of 230 mm. Table 1 lists the power levels and speeds for each of the curves shown in these figures. The glass properties used in the calculations of FIG. 2 correspond to those of Corning Incorporated's EAGLE$^{2000}$® glass. The figure also shows the areas where the cooling process takes place (quenching areas).

The horizontal dotted line in this figure indicates the strain point of the glass used in performing these calculations, i.e., 666° C. In accordance with the invention, this temperature represents an upper limit which should not be exceeded during scoring in order to avoid generation of excessive residual stress in the glass. As a general rule, lower maximum glass temperatures are preferred to higher maximum temperatures, assuming that heating of the glass surface and its subsequent quenching generate enough tensile stress to propagate the vent. In this way, the residual stress in the finished edge and sheet can be minimized.

The calculated results of FIG. 2 show combinations of scoring parameters that can be successfully used without producing excessive residual stress as well as combinations (see reference numbers 100 and 110) that entail overheating of the glass (e.g., heating the glass so that T>666° C.). The calculated results also show combinations of laser power and exposure time that can be used to run the process at reduced glass surface temperatures while still achieving a transient tensile stress level sufficient to create a vent (see reference numbers 70, 80, and 90). As shown below, these calculated results were confirmed experimentally.

Other calculations and experiments (results not shown) demonstrated that by adjusting laser power, changes in scoring speed associated with beam acceleration and deceleration can be accommodated so as to maintain the glass' surface temperature within a process window where scoring is successfully accomplished without a significant effect on the vent depth and residual stress. More particularly, in these calculations and experiments, laser power was increased during acceleration and decreased during deceleration so that the thermal histories of the points on the glass corresponding to these changes in scoring speed were substantially similar to those where the scoring speed was a constant. In this way, the resulting glass temperature induced by the laser and the vent were substantially uniform over its length, as was the resulting separated edges when the glass sheet was divided into two sub-pieces at the vent.

As noted above, minimizing the glass surface temperature during the scoring process helps to reduce the residual stress in the glass. However, the thermal stress generated during the scoring must be high enough to create a vent. A series of experiments were performed to address these competing considerations. These experiments showed that for a given maximum temperature for the portion of the surface under the laser beam, the thermal stress can be increased by changing the location of the coolant spot relative to the beam. This was also confirmed by calculating the transient thermal stress as a function of the parameters $\tau$ and D in FIG. 1C.

Figure 3:
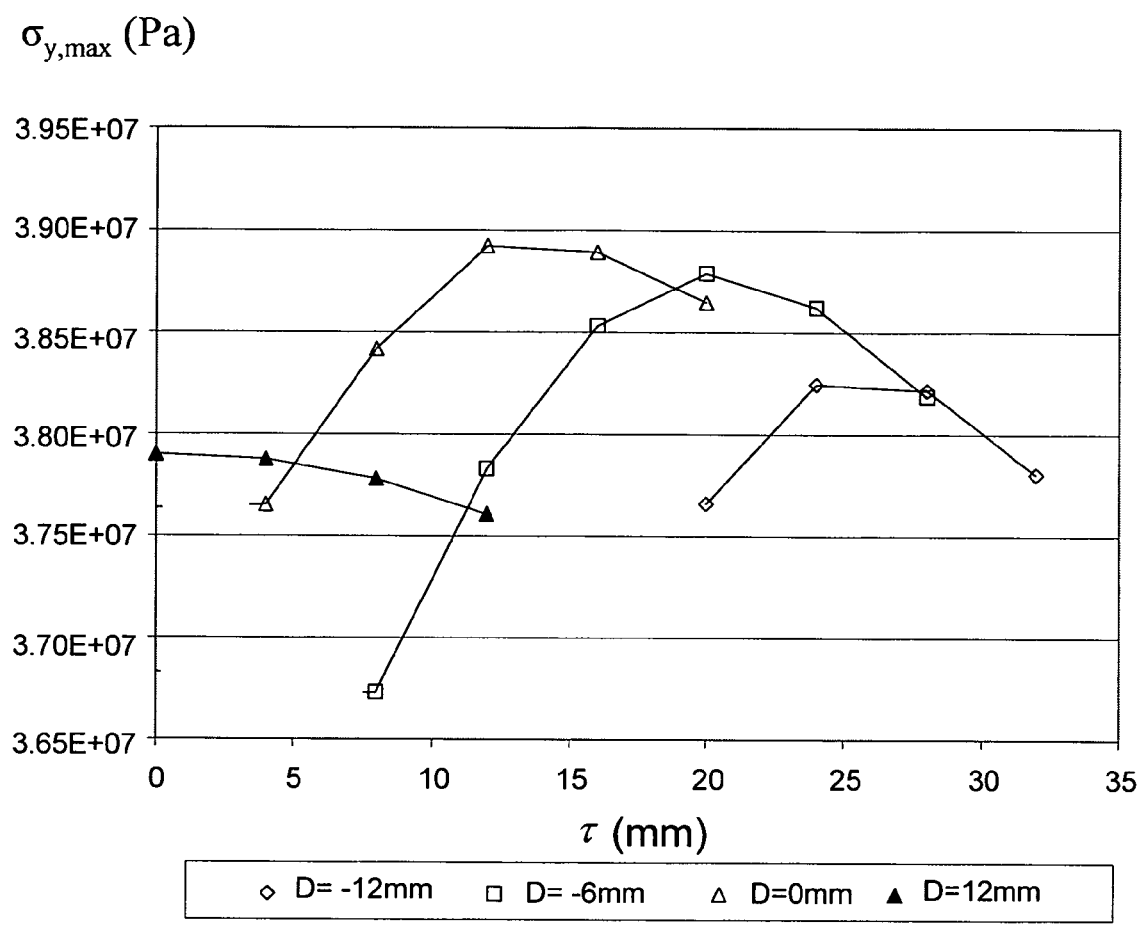

The results of these calculations are shown in FIG. 3. As can be seen in this figure, for each distance D (i.e., the distance from the center of the coolant spot to the edge of the unblocked beam; see FIG. 1C), there is a range of $\tau$ values (i.e., the length of the beam blockage; see FIG. 1C) over which the transient thermal stress has its highest values. These calculated results are qualitatively consistent with what was observed experimentally.

Figure 4:
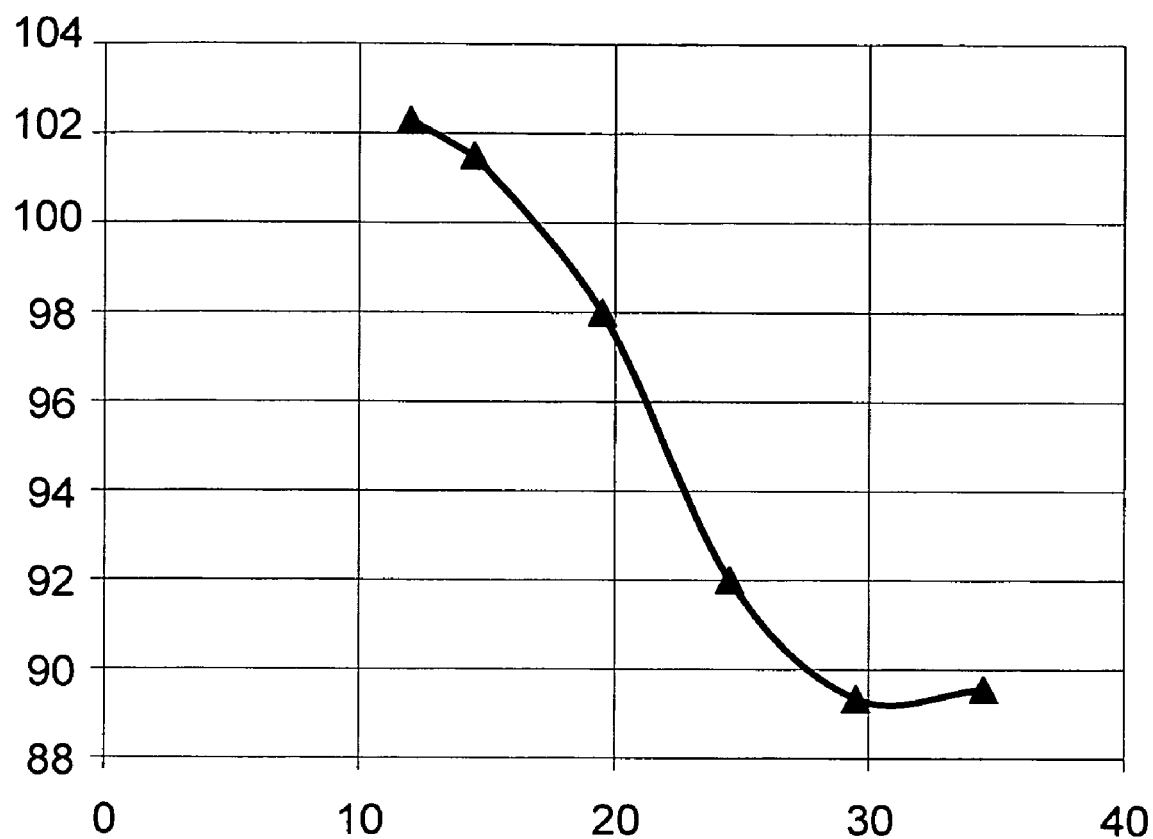

Adjustment of $\tau$ (and D) thus provides an effective approach for achieving sufficient tensile stress to produce a vent while not creating excessive levels of residual stress. Moreover, $\tau$ also affects vent depth, with the depth being smaller for larger truncations (larger $\tau$ values). In general, vent depth has been found to be a non-linear function of $\tau$ or, in other words, a non-linear function of the length b in FIG. 1C. This effect is shown in FIG. 4, where the upper part of this graph represents a suitable range of $\tau$ values that have been found to work successfully in the scoring of 0.7 mm LCD glass. It should be noted that the non-linear behavior shown in FIG. 4 differs from that described in the '284, '220, and '875 patents, where a linear dependence of vent depth as a function of b (see FIGS. 1A and 1B) was predicted.

Figure 5:
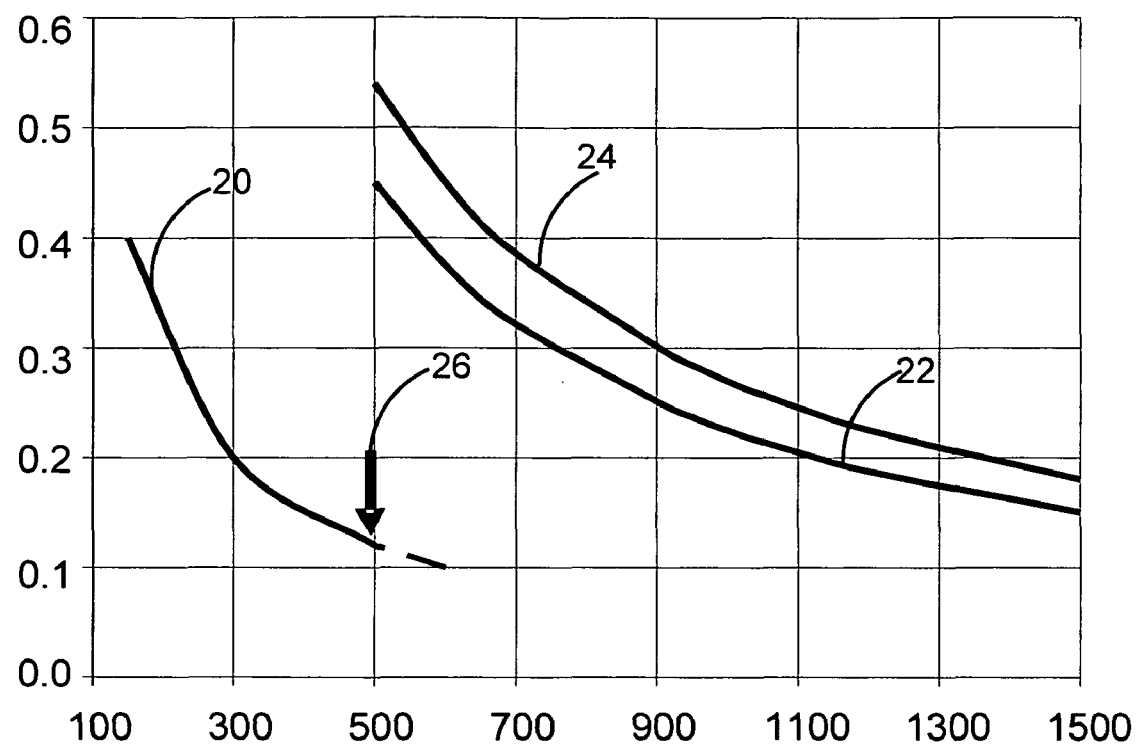

Increases in scoring speed, in general, lead to reductions in vent depth, which makes the subsequent separation of the glass sheet into two sub-pieces unreliable. A major drawback of existing laser scoring techniques has been the limited exposure (or residence) time provided by short laser beams. The exposure time becomes progressively short (e.g., ~100-120 ms) when the scoring speed approaches or exceeds 500 mm/s. This effect is shown in FIG. 5 where exposure time versus scoring speed is plotted for a prior art beam length (60 mm;

see reference number 20) and representative beam lengths of the present invention (250 mm and 300 mm; see reference numbers 22 and 24, respectively). The maximum scoring speed achievable with prior art beam lengths is also shown in this figure (see reference number 26).

Through a series of calculations and experiments, it was demonstrated that these short exposure times are insufficient to heat the glass surface up to the required temperature for reliable vent formation, unless a high power density beam is used. Such high power densities, however, create a serious residual stress problem. The exposure times are also too short to create a vent deep enough to guarantee successful separation at the vent line.

As discussed above, in accordance with the invention, an elongated beam having an untruncated length $L_0$ greater than or equal to 200 millimeters is used to perform the scoring. In the nomenclature of FIG. 1C, $L_0=b+\tau$. Such a beam can provide an exposure time 3-5 times longer than that of a conventional laser scoring process at a scoring speed of 500 mm/s. This enables heat transfer deep into the glass at a much higher scoring speed without overheating the glass surface. The vent depth created by such a beam can exceed 10% of the glass thickness even at a speed of 1000 mm/s or higher, which guarantees reliable separation. Although there is no theoretical limit on the length of the laser beam used in the practice of the invention, based on cost and other practical considerations, $L_0$ will typically be about 300 mm or less, although longer beams can be used if desired.

The laser beam will typically be produced by a $CO_2$ laser, although other types of lasers can be used if desired. To achieve an $L_0$ value of 200 millimeters or longer, the beam will typically be passed through a beam expander and then elongated using cylindrical optics. For purposes of the present invention, the $L_0$ value for an untruncated beam is determined using the $1/e^2$ definition of beam length of the ISO 11146 standard. That is, the boundaries of the laser beam are defined as the locations at which beam intensity has fallen to $1/e^2$ of its peak value $I_{peak}$. According to this definition approximately 86% of the total beam energy is transmitted through the defined boundaries.

As discussed above, in accordance with the invention, the maximum temperature $T_{max}$ at the surface of the glass surface during scoring is kept below or at most equal to the glass' strain point $T_{strain}$, i.e., the temperature at which the glass has a viscosity of $10^{13.5}$ Pa·s ($10^{14.5}$ poise). Preferably, $T_{max} \leq T_{strain}-30$, more preferably, $T_{max} \leq T_{strain}-60$, and most preferably, $T_{max} \leq T_{strain}-100$, where $T_{max}$ and $T_{strain}$ are in ° C. For lower scoring speeds of 500 mm/sec or less, the maximum glass temperature can be below ($T_{strain}-150$) or even ($T_{strain}-200$). The glass temperature can be measured in various ways, a preferred procedure being through the use of a thermal imaging (thermal vision) camera.

As also discussed above, by controlling $T_{max}$ in this way, the amount of residual stress in the glass is reduced. Preferably, the peak residual stress in sub-pieces produced from the glass sheet is less than or equal to 300 psi and most preferably, less than or equal to 100 psi. In some cases, peak residual stresses above 300 psi can be tolerated, e.g., stresses ranging up to 500 psi. Specifically, such higher stress levels may be acceptable if the glass sheet is not likely to undergo significant additional edge stresses. Also, in the case of large glass sheets, distortion in the body of the sheet is likely to be small because of the sheet's large size even for a high peak value at an edge. The peak residual stress in a scored and separated sheet is preferably measured using a birefringence technique.

As will be evident from the foregoing, the invention can be practiced using an untruncated beam but preferably employs a beam which has been truncated on one end, i.e., its trailing end closest to (proximal to) the coolant area. The truncation can be performed using a shield specifically constructed for this purpose. Alternatively, a portion of the nozzle assembly used to apply coolant to the sheet can be positioned to intercept and thus truncate the trailing part of the beam. This latter approach is illustrated in FIG. 1C where the untruncated beam 21 is intercepted by the housing of nozzle 19 and thus becomes truncated beam 13 at the surface of the glass.

It should be noted that unlike the case described in the '875 patent, the degree of beam blockage in accordance with the present invention preferably does not exceed approximately 20% of the total beam length. Also, again unlike the '875 patent, the degree of beam blockage is preferably selected depending on the desired scoring speed. Moreover, when the cooling nozzle assembly is used to perform beam blockage, selection of a desired position of the coolant zone within the beam leads to a different degree of truncation of the beam (different τ value) while at the same time holding constant the distance L from the rear edge of the beam to the front edge of the cooled area (see FIG. 1C), i.e., for this configuration, L does not depend on τ. The use of a constant L which is independent of r may also be implemented in systems which use a shield, rather than the nozzle assembly, to perform truncation.

Without intending to limit it in any manner, the present invention will be further illustrated by the following examples.

D. Experimental Results

The experimental data was obtained using a circular polarized $CO_2$ laser beam which was passed through a variable beam expander and then was transformed into an elongated beam using cylindrical optics. The optical system allowed the length of the beam to be adjusted along the scoring direction to obtain untruncated lengths $L_0$ equal to or greater than 200 mm. The coolant jet was positioned to contact the glass sheet inside the trailing edge of the untruncated beam. As shown in FIG. 1C, the beam was truncated using the body of the nozzle.

Figure 6:
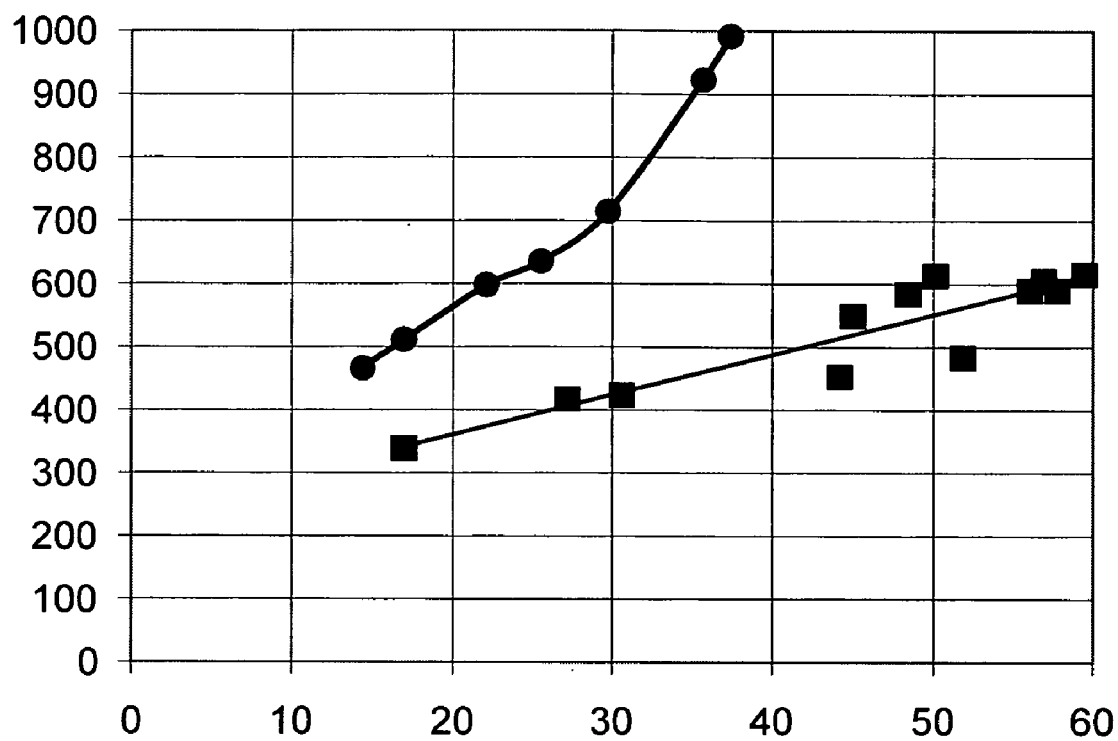

FIG. 6 compares the peak surface temperature of the glass produced by a beam of the invention (square data points) with that produced by a reference beam (circular data points). In particular, the beam of the invention had an untruncated length of 200 mm and was truncated by 10-15 mm while the reference beam had an untruncated length of 100 mm and was used without truncation. The distance L (see FIG. 1) was in each case equal to 3-6 mm. The glass used in these experiments was Corning's EAGLE$^{2000}$® glass. The surface temperatures of the glass were measured using a thermal-vision camera. In this figure, higher laser powers correspond to higher scoring speeds.

As can be seen in this figure, for the reference beam, the surface temperature rapidly climbs above 700° C. at relative laser power levels exceeding 30%. For the beam representing the invention, on the other hand, the surface temperature stays below the glass strain point, even when the relative laser power exceeds 60%. From the point of view of scoring speed, this and related experiments demonstrated that use of the reference beam can easily cause an overheating of the glass surface with glass temperature raising well above 600° C. when the scoring speed just exceeds 450-500 mm/sec, whereas when the beam of the invention is used, the maximum glass temperature remains below 600° C. even when the scoring speed approaches 1000 mm/sec. The invention thus permits laser scoring to be performed at higher speeds without overheating of the glass.

Figure 7:
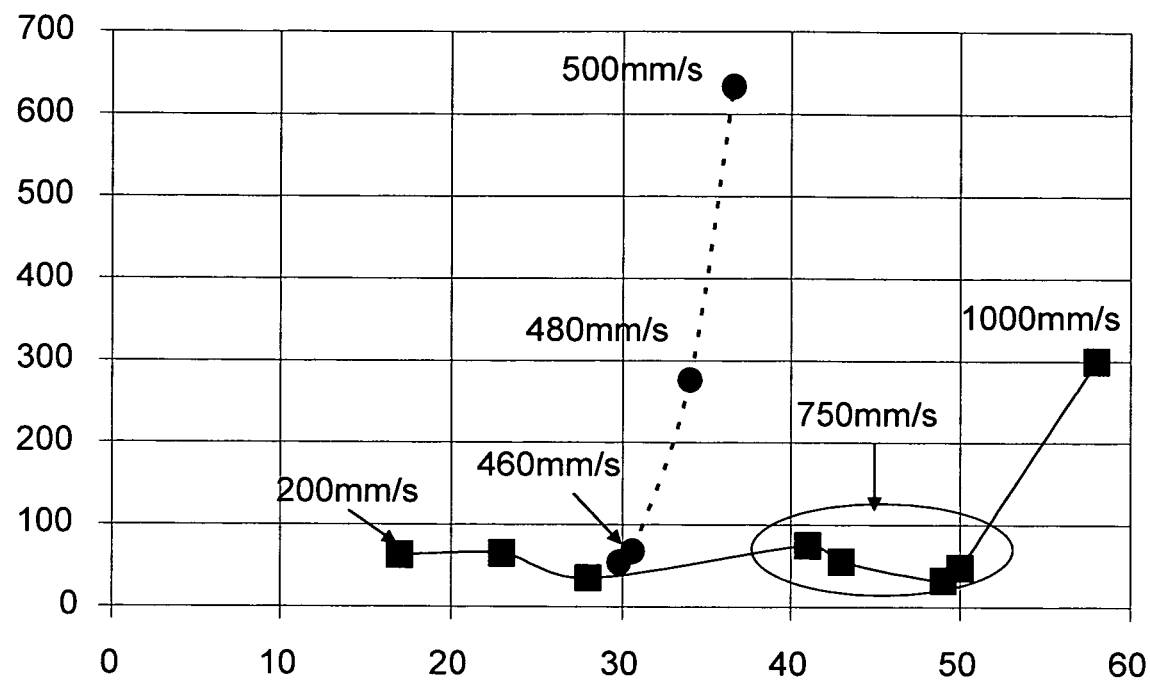

As discussed above, overheating of the glass is undesirable because, among other things, it leads to excessive levels of residual stress in the separated sub-pieces. This effect is shown in FIG. 7 which sets forth measured peak residual stress in the separated sub-pieces resulting from scoring with the reference (circular data points) and inventive (square data points) beams described above. The scoring speeds are also shown in this figure. As can be seen, the reference beam results in stress levels well above the 500 psi level once the scoring speed exceeds 500 mm/sec while the beam of the invention remains well below this level even at speeds of 1000 mm/sec.

Figure 8:
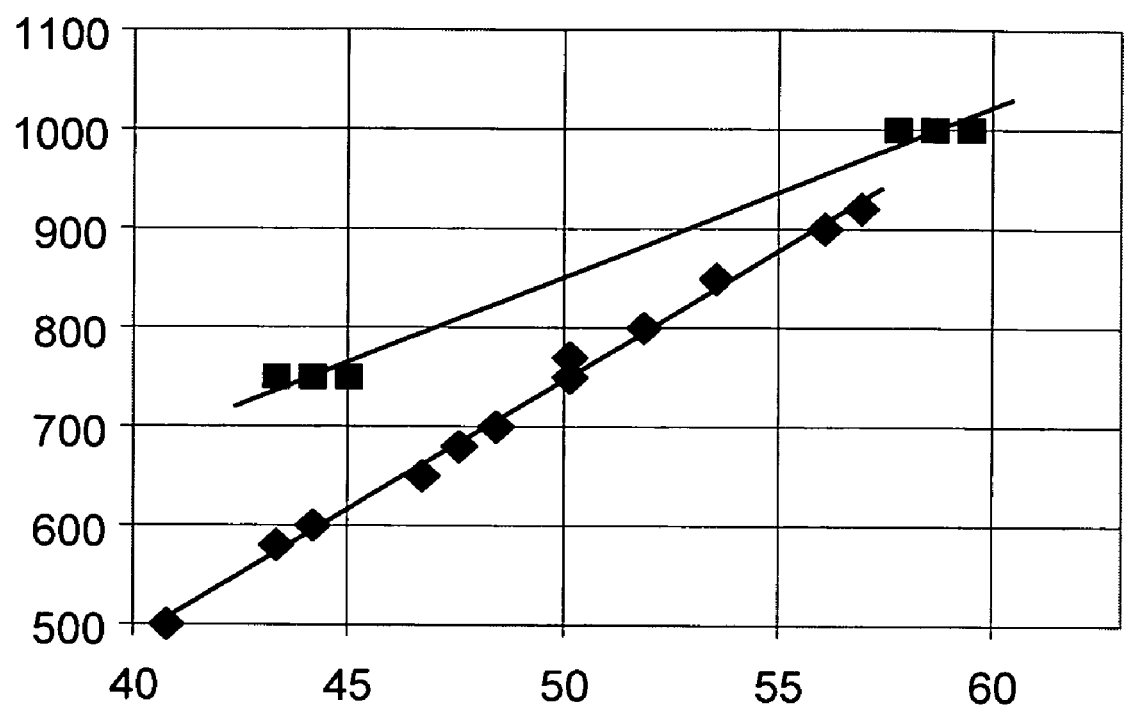
FIG. 8 is a graph of scoring speed versus laser power achieved without generating excessive residual stress for Corning's EAGLE$^{2000}$® (diamond-shaped data points) and EAGLE XG™ (square data points) LCD glasses. The vertical axis shows scoring speed in millimeters per second and the horizontal axis shows laser power in %.
Figure 9:
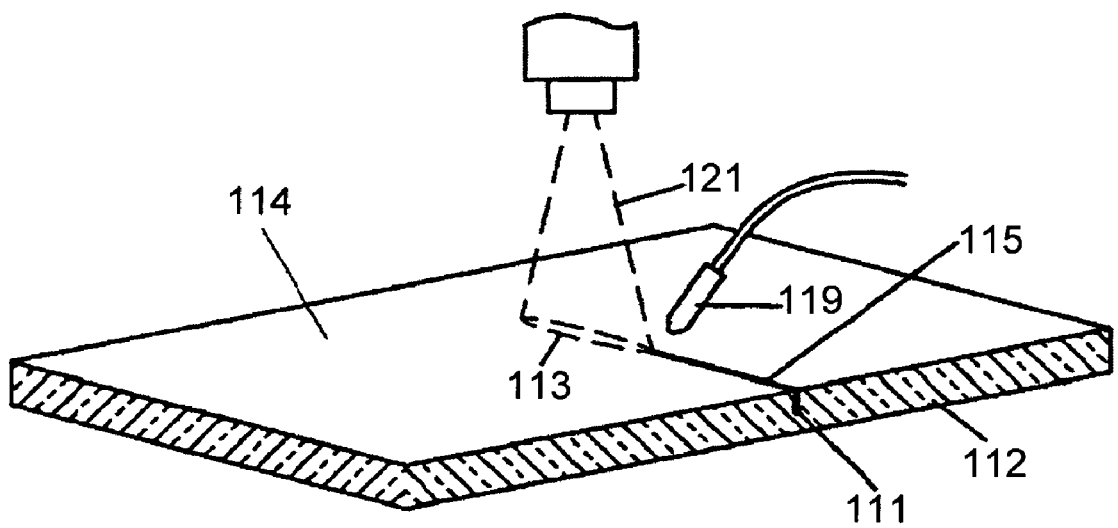
FIG. 9 is a schematic diagram of a prior art scoring system.

FIG. 8 illustrates the ability of the laser beam of the invention to score glass substrates having low CTE's. The same laser beam was used as in generating the square data points of FIGS. 6 and 7. The diamond-shaped data points in FIG. 8 are for Corning's EAGLE$^{2000}$® glass while the square data points are for Corning's EAGLE XG™ glass. As shown in this figure, the laser beam of the invention successfully scored substrates composed of these low CTE glasses at laser power levels corresponding to speeds well-above 500 mm/sec, e.g., 750-1000 mm/s. Moreover, the resulting sub-pieces had low levels of residual stress, i.e., levels typically less than or equal to 100 psi. Breaking of the glass sheets scored in this manner was completed by glass bending or by using a no-bend, ultrasonic separation method.

As illustrated by the above experimental data, the use of an elongated laser beam in combination with partial blockage of the beam's trailing edge allows for effective scoring of glass sheets. In particular, the combination allows the quenching location to be selected so as to maximize the vent depth and also to maximize the thermal stress gradient generated during the scoring without increasing the maximum glass surface temperature. The technique allows high scoring speeds, e.g., speeds equal to or above 750-1000 mm/s, to be achieved without adding residual stress even for glass substrates having low CTEs.

Although specific embodiments of the invention have been described and illustrated, it is to be understood that modifications can be made without departing from the invention's spirit and scope. For example, although the invention has been discussed and illustrated in terms of the scoring of LCD glass having a thickness of 0.7 mm using a CO$_2$ laser operating at 10.6 μm, the invention can be applied to other types of glasses and can use other types of lasers operating at different wavelengths if desired.

A variety of other modifications which do not depart from the scope and spirit of the invention will be evident to persons of ordinary skill in the art from the disclosure herein. The following claims are intended to cover the specific embodiments set forth herein as well as such modifications, variations, and equivalents.

TABLE 1

| Reference No. | Beam Length (mm) | Power (w) | Speed (mm/sec) |
|---|---|---|---|
| 70 | 230 | 450 | 600 |
| 80 | 230 | 500 | 750 |
| 90 | 230 | 575 | 900 |
| 100 | 230 | 730 | 710 |
| 110 | 230 | 825 | 920 |

What is claimed is:

1. A method of scoring a glass sheet comprising:
 (a) translating an elongated laser beam having a peak intensity I$_{peak}$ over a surface of the glass sheet at a speed S, said beam being characterized by an untruncated length L$_0$, where L$_0$ equals the maximum distance along the length of the beam between locations at which the beam intensity at the surface of the glass sheet, in the absence of any truncation, has fallen to 1/e$^2$ of I$_{peak}$; and
 (b) translating a coolant area over the surface of the glass sheet in tandem with the laser beam;
 wherein:
 (i) S is greater than 500 millimeters/second;
 (ii) L$_0$ is greater than or equal to 200 millimeters; and
 (iii) I$_{peak}$ and L$_0$ are selected such that the translation of the laser beam over the surface of the glass sheet at the speed S produces a maximum temperature at the surface of the glass sheet that is less than or equal to the glass' strain point.

2. The method of claim 1 wherein prior to contacting the surface of the glass sheet, a portion of the beam is truncated, said portion being proximal to the coolant area.

3. The method of claim 2 wherein the coolant area is located within the portion of the beam that would have contacted the surface of the glass sheet if the beam had not been truncated.

4. The method of claim 2 wherein the length of the truncated portion of the beam is less than or equal to 0.2*L$_0$.

5. The method of claim 2 wherein the coolant area is produced by a nozzle assembly and at least a portion of that assembly intercepts and thereby truncates the laser beam.

6. The method of claim 1 wherein the scoring produces a vent in the glass sheet whose depth is at least 10% of the glass sheet's thickness.

7. The method of claim 1 wherein the maximum temperature T$_{max}$ at the surface of the glass sheet satisfies the relationship:

$$T_{max} \leq T_{strain} - 100,$$

where T$_{strain}$ is the strain point of the glass and T$_{max}$ and T$_{strain}$ are in degrees centigrade.

8. The method of claim 1 wherein the peak residual stress in sub-pieces produced from the glass sheet is less than or equal to 500 psi.

9. The method of claim 1 wherein the peak residual stress in sub-pieces produced from the glass sheet is less than or equal to 100 psi.

10. A method of operating a laser scoring system in which a vent is produced in a glass sheet by translating a truncated laser beam over a surface of the sheet at a speed S in tandem with a coolant area which has a center point, said method comprising selecting the amount of truncation of the laser beam, or the distance between the center point of the coolant area and the nearest end of the laser beam prior to truncation, or both the amount of truncation and the distance between the center point of the coolant area and the nearest end of the laser beam prior to truncation to control at least one of (i) the depth of the vent and (ii) the residual stress in sub-pieces produced from the sheet wherein the translation of the laser beam over the surface of the glass sheet at the speed S produces a maximum temperature at the surface of the glass sheet that is less than or equal to the glass' strain point.

11. A method of operating a laser scoring system in which a vent is produced in a glass sheet by translating a truncated laser beam over a surface of the sheet at a speed S in tandem with a coolant area which has an outer edge, said truncation of the laser beam producing a truncated edge proximal to the coolant area, said method comprising:

(a) changing the amount of truncation of the laser beam to accommodate or effectuate one or more of: a change in scoring speed, a change in vent depth, a change in glass composition, a change in sheet thickness, a change in residual stress in sub-pieces produced from the sheet, and a change in edge properties of sub-pieces produced from the sheet; and (b) as the amount of truncation of the laser beam is changed, holding constant the spacing between (i) the truncated edge of the laser beam and (ii) the portion of the outer edge of the coolant area closest to the truncated edge of the laser beam;

wherein the translation of the laser beam over the surface of the glass sheet at the speed S produces a maximum temperature at the surface of the glass sheet that is less than or equal to the glass' strain point.

\* \* \* \* \*